United States Patent
Wakeford et al.

(10) Patent No.: US 11,980,819 B2
(45) Date of Patent: *May 14, 2024

(54) ADJUSTING INDIVIDUALIZED CONTENT MADE AVAILABLE TO USERS OF AN ONLINE GAME BASED ON USER GAMEPLAY INFORMATION

(71) Applicant: Kabam, Inc., San Francisco, CA (US)

(72) Inventors: Kent Wakeford, Hillsborough, CA (US); Clifford J. Harrington, San Francisco, CA (US); Matthew Curtis, Novato, CA (US); James Koh, Mountain View, CA (US); Kellen Christopher Smalley, Dublin, CA (US); Michael C. Caldarone, Palo Alto, CA (US)

(73) Assignee: Kabam, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/069,784

(22) Filed: Dec. 21, 2022

(65) Prior Publication Data
US 2023/0125891 A1 Apr. 27, 2023

Related U.S. Application Data

(63) Continuation of application No. 17/172,044, filed on Feb. 9, 2021, now Pat. No. 11,571,624, which is a
(Continued)

(51) Int. Cl.
*A63F 9/24* (2006.01)
*A63F 13/00* (2014.01)
(Continued)

(52) U.S. Cl.
CPC .............. *A63F 13/67* (2014.09); *A63F 13/00* (2013.01); *A63F 13/35* (2014.09); *A63F 13/69* (2014.09); *A63F 13/79* (2014.09)

(58) Field of Classification Search
CPC .......... A63F 13/67; A63F 13/35; A63F 13/69; A63F 13/79; A63F 13/00; A63F 13/12
(Continued)

(56) References Cited

U.S. PATENT DOCUMENTS 6,634,949 B1 10/2003 Briggs
7,179,166 B1 2/2007 Abbott
(Continued)

*Primary Examiner* — Michael A Cuff
(74) *Attorney, Agent, or Firm* — Esplin & Associates, PC

(57) ABSTRACT

This disclosure relates to adjusting individualized content made available to users of an online game based on user gameplay information. In implementations, information relating to prospective usage of the online game is used to classify users according by user type, and content made available to the users is customized accordingly. Information relating to prospective usage may include predictive information such as demographic and geographic information, as well as game usage information for the users. User types may include resource collection, player versus player, and player versus environment. Customized content may include content made available to the users through the users in-game actions, such as exploring a map, researching a technology or skill, purchasing an in-game item, and completing an in-game achievement, including in-game items, in-game powers, in-game skills, in-game technologies, in-game pets, in-game transportation units, in-game units, and in-game buildings.

20 Claims, 3 Drawing Sheets

Related U.S. Application Data continuation of application No. 16/417,613, filed on May 20, 2019, now Pat. No. 10,933,329, which is a continuation of application No. 15/873,701, filed on Jan. 17, 2018, now Pat. No. 10,322,350, which is a continuation of application No. 15/182,339, filed on Jun. 14, 2016, now Pat. No. 9,889,380, which is a continuation of application No. 13/856,386, filed on Apr. 3, 2013, now Pat. No. 9,375,636.

(51) Int. Cl.
  *A63F 13/35* (2014.01)
  *A63F 13/67* (2014.01)
  *A63F 13/69* (2014.01)
  *A63F 13/79* (2014.01)

(58) Field of Classification Search
  USPC .......................................................... 463/23
  See application file for complete search history.

(56) References Cited

U.S. PATENT DOCUMENTS

| | | |
|---|---|---|
| 8,684,807 B1 | 4/2014 | Crici |
| 10,421,009 B1 | 9/2019 | Wakeford |
| 10,456,664 B2 | 10/2019 | Wakeford |
| 10,625,161 B2 | 4/2020 | Wakeford |
| 10,933,329 B2 | 3/2021 | Wakeford |
| 11,052,318 B2 | 7/2021 | Wakeford |
| 2005/0182693 A1 | 8/2005 | Alivandi |
| 2006/0121992 A1 | 6/2006 | Bortnik |
| 2006/0247055 A1 | 11/2006 | O'Kelley et al. |
| 2007/0087834 A1 | 4/2007 | Moser |
| 2008/0032787 A1 | 2/2008 | Low |
| 2008/0098417 A1 | 4/2008 | Hatamian |
| 2009/0075738 A1 | 3/2009 | Pearce |
| 2009/0131152 A1 | 5/2009 | Busse |
| 2009/0210301 A1 | 8/2009 | Porter |
| 2010/0050088 A1 | 2/2010 | Neustaedter |
| 2010/0094841 A1 | 4/2010 | Bardwil |
| 2010/0299617 A1 | 11/2010 | Fischer |
| 2011/0014972 A1 | 1/2011 | Herrmann |
| 2011/0045912 A1 | 2/2011 | Bortnik |
| 2011/0092273 A1 | 4/2011 | Cerbini |
| 2011/0113353 A1 | 5/2011 | Koh |
| 2011/0145040 A1 | 6/2011 | Zahn |
| 2011/0275431 A1 | 11/2011 | Hirzel |
| 2012/0042282 A1 | 2/2012 | Wong |
| 2012/0069131 A1 | 3/2012 | Abelow |
| 2012/0101886 A1 | 4/2012 | Subramanian |
| 2012/0142429 A1 | 6/2012 | Muller |
| 2012/0178529 A1 | 7/2012 | Collard |
| 2012/0197874 A1 | 8/2012 | Zatkin |
| 2012/0264509 A1 | 10/2012 | Bortnik |
| 2013/0116032 A1 | 5/2013 | Lutnick |
| 2013/0190094 A1 | 7/2013 | Ronen |
| 2013/0226733 A1 | 8/2013 | Evans |
| 2013/0303288 A1 | 11/2013 | McCoy |
| 2013/0326354 A1 | 12/2013 | Anderson |
| 2014/0038716 A1 | 2/2014 | Endo |
| 2014/0122702 A1 | 5/2014 | Jung |
| 2014/0201707 A1 | 7/2014 | Schroeder |
| 2019/0270016 A1 | 9/2019 | Wakeford |
| 2020/0038744 A1 | 2/2020 | Wakeford |
| 2020/0246705 A1 | 8/2020 | Wakeford |
| 2021/0162308 A1 | 6/2021 | Wakeford |

ADJUSTING INDIVIDUALIZED CONTENT MADE AVAILABLE TO USERS OF AN ONLINE GAME BASED ON USER GAMEPLAY INFORMATION

FIELD OF THE DISCLOSURE

This disclosure relates to a system for adjusting individualized content made available to the users of an online game based on gameplay information.

BACKGROUND

It is known that within online games, users tend to participate in various aspects of the game and eschew others. These aspects include, for example, a collection/harvesting mechanic in which resources are collected, cultivated, manufactured, etc. Another aspect includes Player versus Player ("PvP") gameplay in which users seek to engage in compete directly with other players within the game (e.g., battling). Yet another aspect includes Player versus Environment ("PvE") gameplay in which users seek to complete "quests" or other tasks within the game to gain points, virtual items, and/or other rewards. In conventional online games, the content available for discovery, unlocking, or winning through accomplishment tends to be the same without regard for the playing style of the users. This may be unsatisfying for players.

SUMMARY OF THE DISCLOSURE

One aspect of the disclosure relates to a system for adjusting individualized content made available to users of an online game, in accordance with one or more implementations. In exemplary implementations, adjusting the content presented to a user of an online game may be performed by processors executing computer program modules. In some implementations, the system may include one or more servers. The server(s) may be configured to communicate with one or more client computing platforms according to a client/server architecture. The users may access the system via the client computing platforms, for instance, to engage in one or more games.

The server(s) may be configured to execute one or more computer program modules to provide one or more games to users (or players). The computer program modules may include one or more of a game module, a user information module, a customization module, a user type module and/or other modules. It is noted that the client computing platforms may include one or more computer program modules that are the same as or similar to the computer program modules of the server(s) to facilitate individualized content made available to the users of online games.

The game module may be configured to execute an instance of the online game to facilitate presentation of the online game to the users. The game module may be configured to implement in-game actions in the instance of the online game in response to action requests for the in-game actions from the users, wherein the users include a first user. The game module may be configured to implement the customizations determined for the individual users such that the first customization is implemented in the instance of the online game for the first user.

The user information module may be configured to obtain user gameplay information related to prospective usage of the online game by the users. The user information module may be configured to obtain gameplay information that includes a first set of user gameplay information related to prospective usage of the online game by the first user. The user information module may be configured to monitor the users' usage of the online game.

In certain implementations, the first set of user gameplay information may include online game usage information associated with other users associated with the first user. In yet another implementation, the first set of user gameplay information may include the first user's usage of other online games and other users' usage of the online game. In yet another implementation, the user's gameplay information may be derived from other users associated with the user. In some implementations, the first set of user gameplay information includes specific in-game actions and in-game action types performed frequently by the first user within the instance of the online game.

The customization module may be configured to determine customizations of content in the online game made available to the individual users through participation and/or achievement within the online game. The customization module may be configured to determine customization content and the customizations may be designed to enhance prospective usage of the online game by the user. The customization module may determine customizations based on the obtained user gameplay information, in which the customizations include a first customization of content made available to the first user to enhance prospective usage of the online game by the first user, wherein the first customization is determined based on the first set of user gameplay information.

The customization module may be configured to determine the customizations for the users based on the user types such that the determination of the first customization for the first user is determined based on the first user type for the first user. The customization affects content that may be made available to the first user through the first user's in-game actions. The user's in-game actions may include at least one of exploring a map, researching a technology or skill, purchasing an in-game item, and completing an in-game achievement. The customization affected content may include in-game items, in-game powers, in-game skills, in-game technologies, in-game transportation units, in-game units, and in-game buildings.

The user type module may be configured to determine user types of users based on obtained user gameplay information. The user type module may be configured to determine a first user type for the first user based on the first set of user gameplay information.

In certain implementations user types may include a collection and harvesting type preferring at least one of resource collection, resource cultivation and resource manufacturing, a player versus player type, preferring competition with other users within the online game (e.g., battling, first person shooters), and/or a player versus environment type preferring completing quests.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As

DETAILED DESCRIPTION

Figure 1:
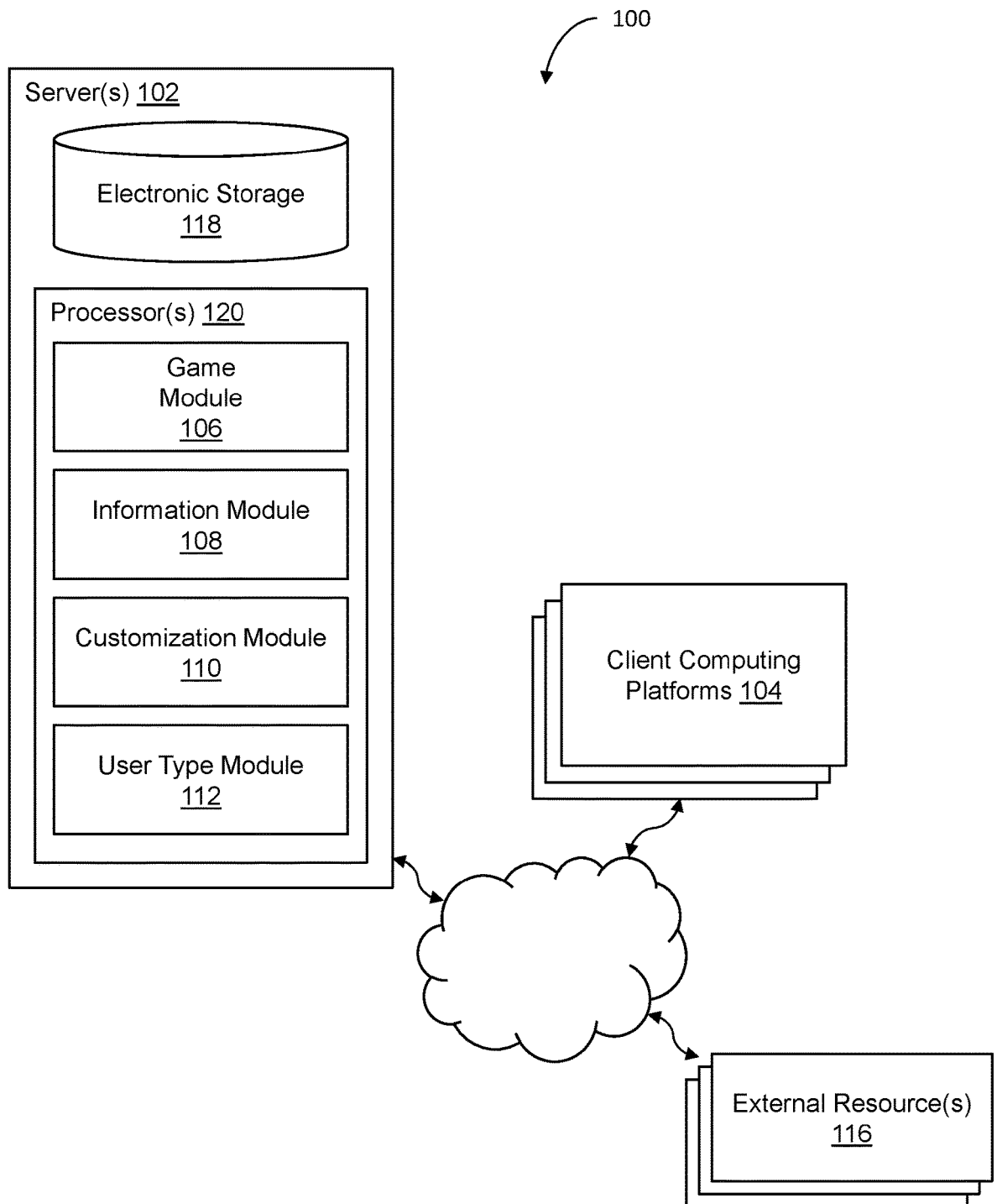
FIG. 1 illustrates a system for adjusting individualized content made available to users of an online game, in accordance with one or more implementations.

FIG. 1 illustrates a system 100 configured to provide a virtual space. System 100 is only one example of a suitable computing environment and is not intended to suggest any limitation as to the scope of use or functionality of the features described herein. Providing the virtual space may include hosting the virtual space over a network.

In this disclosure, aspects of an online game that a user most enjoys may be identified, and content that is available for unlocking, discovery, or winning within the game may be adjusted based on the gameplay the user enjoys. Accordingly, embodiments may be configured for users to discover, unlock or win gaming content that is tailored to the user's playing style, resulting in a virtual game that may provide more engaging and immersive in-game experiences.

In some implementations, system 100 may include one or more servers 102. The server 102 may be configured to communicate with one or more client computing platforms 104 according to a client/server architecture. The users may access system 100 and/or the virtual space via client computing platforms 104, for instance, to engage in one or more games.

The server(s) 102 may be configured to execute one or more computer program modules. The computer program modules may include one or more of a game module 106, an information module 108, a customization module 110, a user type module 112, and/or other modules. As noted, the client computing platform(s) 104 may include one or more computer program modules that are the same as or similar to the computer program modules of the server(s) 102 to facilitate in-game actions.

The game module 106 may be configured to execute an instance of a game to facilitate presentation of the game to users. The game module 106 may be configured to implement in-game actions in the instance of the game, in response to action requests for the in-game actions by the users.

The game may be provided via a virtual space, and may include a plurality of resource types and/or maps. An instance of the virtual space may be executed by computer modules to determine views of the virtual space. The views may then be communicated (e.g., via streaming, via object/position data, and/or other information) from server(s) 102 and/or sources to client computing platforms 104 for presentation to users. The view determined and transmitted to a given client computing platform 104 may correspond to a location in the virtual space (e.g., the location from which the view is taken, the location the view depicts, and/or other locations), a zoom ratio, a dimensionality of objects, a point-of-view, and/or view parameters. One or more of the view parameters may be selectable by the user.

The instance of the virtual space may comprise a simulated space that is accessible by users via clients (e.g., client computing platform(s) 104) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial section of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The above description of the manner in which views of the virtual space are provided is not intended to be limiting. The virtual space may be expressed in a more limited, or more rich, manner. For example, views determined for the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that corresponds to an individual user. The user character may be controlled by the user with which it is associated.

User-controlled element(s) may move through and interact with the virtual space (e.g., non-user characters in the virtual space, other objects in the virtual space). The user-controlled elements controlled by and/or associated with a given user may be created and/or customized by the given user. The user may have an "inventory" of virtual goods and/or currency (e.g., resources of the plurality of resource types) that the user can use (e.g., by manipulation of a user character or other user-controlled element, and/or other items) to perform in-game actions within the virtual space.

The users may participate in the instance of the virtual space by controlling one or more of the available user-controlled elements in the virtual space. Control may be exercised through control inputs and/or commands input by the users through client computing platforms 104. The users may interact with each other through communications exchanged within the virtual space. Such communications may include one or more of textual chat, instant messages, private messages, voice communications, and/or other communications. Communications may be received and entered by the users via their respective client computing platforms 104. Communications may be routed to and from the appropriate users through server(s) 102.

In implementations, the game module 106 may also be configured to implement the customizations determined for the individual users.

The user information module 108 may be configured to obtain user gameplay information related to prospective usage of the online game by the users. In implementations, user information module 108 may be further configured to monitor the users' usage of the online game. User gameplay information may include information about the users that has some value in predicting their preferred styles of gameplay, for example demographic and geographic information, device type, interests, activity in other online games, and information about associated users, in addition to in-game actions taken by the users in the online game. Such information may be obtained directly from the users, for example using pop-ups and/or other graphical interfaces, automatically from users' social network or other profiles, from IP addresses, cookies, etc.

The customization module 110 may be configured to determine customizations of content in the online game made available to the individual users through participation and/or achievement within the online game. The customizations may derive from sets of user gameplay information and are designed to enhance prospective usage of the online game by the users. Determination of these customizations may be based on the user gameplay information obtained for example via the monitoring of users and others the users have relationships with (e.g., in a social network and/or within the online game). Moreover, customizations of user gameplay content may be performed on a reactionary basis, based on previous actions and gameplay by a user, and/or using a predictive algorithm that anticipates how a user will want to play a game based on information known about that user, such as demographic information, geographic information and/or device type, etc.

Customized content may include content that is provided to a user when performing in-game actions such as exploring a map, researching a technology or skill, purchasing an in-game item, and/or completing an in-game achievement. Such content may include at least one of in-game items, in-game powers, in-game skills, in-game technologies, in-game pets, in-game transportation units, in-game units, and in-game buildings. Thus, for example, in implementations a user identified as preferring resource collection may be able to select resource-collecting powers and skills when leveling up or otherwise advance in the online game, to receive resource collection-related items when defeating enemies or completing quests, to be able to purchase resource collection-related items, pets, units and/or buildings, and/or to research better resource collection technologies, which are not available or are less available to other types of users, For example, such a user might be able to purchase such items at reduced cost, develop such skills/abilities at a faster rate, etc., than for users identified as preferring player versus player or player versus environment activity. Such customizations may improve gameplay for the user, and may actually encourage the user to try other areas of gameplay in order to obtain helpful items, etc. for improved resource collection (e.g. by completing a quest).

In some implementations, items, etc. useful for other aspects of gameplay the user is identified as being less interested in may be provided to the user preferentially. For example, powerful player versus player items might drop when the user that prefers resource collection defeats enemies, enabling the user to compete in and perhaps enjoy player versus player competitions without investing more time than desired.

The user type module 112 is configured to determine user types of users based on obtained user gameplay information. The customization for the users may be based on the determined user types. The user type may be further comprised of at least one of the following: 1) a collection or harvesting type preferring at least one of resource collection, resource cultivation and resource manufacturing; 2) a player versus player type, preferring competing with other users within the online game; and 3) a player versus environment type preferring completing quests. User type determinations may be made based at least in part on the frequency with which users perform certain in-game actions or types of in-game actions. For example, in implementations certain in-game actions may be classified as corresponding to certain user types, e.g. resource harvesting in-game actions correspond to a collection or harvesting type, player battling in-game actions correspond to a player versus player type, etc. User types may then be determined based on the frequency with which users perform these various types of in-game actions.

In some implementations, server(s) 102, client computing platforms 104, and/or external resources 116 may be operatively linked via one or more electronic communication links. For example, such electronic communication links may be established, at least in part, via a network such as the Internet and/or other networks. The network may be a wired or wireless network such as the Internet, an intranet, a LAN, a WAN, a cellular network or another type of network. It will be understood that the network may be a combination of multiple different kinds of wired or wireless networks. It will be appreciated that this is not intended to be limiting, and that the scope of this disclosure includes implementations in which server(s) 102, client computing platforms 104, and/or external resources 116 may be operatively linked via some other communication media.

A given client computing platform 104 may include one or more processors configured to execute computer program modules. The computer program modules may be configured to enable an expert or user associated with the given client computing platform 104 to interface with system 100 and/or external resources 116, and/or provide other functionality attributed herein to client computing platforms 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 116 may include sources of information, hosts and/or providers of virtual environments outside of system 100, external entities participating with system 100, and/or other resources. In some implementations, some or all of the functionality attributed herein to external resources 116 may be provided by resources included in system 100.

Server 102 may include electronic storage 118, one or more processors 120, and/or other components. Server 102 may include communication lines, or ports to enable the exchange of information with a network and/or other computing platforms. Illustration of server 102 in FIG. 1 is not intended to be limiting. Server 102 may include a plurality of hardware, software, and/or firmware components operating together to provide the functionality attributed herein to server 102. For example, server 102 may be implemented by a cloud of computing platforms operating together as server 102.

Electronic storage 118 may comprise non-transitory storage media that electronically stores information. The electronic storage media of electronic storage 118 may include one or both of system storage that is provided integrally (i.e., substantially non-removable) with server 102 and/or removable storage that is removably connectable to server 102 via, for example, a port (e.g., a USB port, a firewire port, etc.) or a drive (e.g., a disk drive, etc.). Electronic storage 118 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 118 may include one or more virtual storage resources (e.g., cloud storage, a virtual private network, and/or other virtual storage resources). Electronic storage 118 may store software algorithms, information determined by processor 120, information received from server 102, information received from client computing platforms 104, and/or other information that enables server xx to function as described herein.

Processor(s) 120 is configured to provide information processing capabilities in server 102. As such, processor 120 may include one or more of a digital processor, an analog processor, a digital circuit designed to process information, an analog circuit designed to process information, a state machine, and/or other mechanisms for electronically processing information. Although processor 120 is shown in FIG. 1 as a single entity, this is for illustrative purposes only. In some implementations, processor 120 may include a plurality of processing units. These processing units may be physically located within the same device, or processor 120 may represent processing functionality of a plurality of devices operating in coordination. The processor 120 may be configured to execute modules 106, 108, 110, and 112. Processor 120 may be configured to execute modules 106, 108, 110, and 112 by software; hardware; firmware; some combination of software, hardware, and/or firmware; and/or other mechanisms for configuring processing capabilities on processor 120. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 106, 108, 110, 112 are illustrated in FIG. 1 as being implemented within a single processing unit, in implementations in which processor 120 includes multiple processing units, one or more of modules 106, 108, 110, and 112 may be implemented remotely from the other modules. The description of the functionality provided by the different modules 106, 108, 110, and 112 described below is for illustrative purposes, and is not intended to be limiting, as any of modules 106, 108, 110, and 112 may provide more or less functionality than is described. For example, one or more of modules 106, 108, 110, and 112 may be eliminated, and some or all of its functionality may be provided by other ones of modules 106, 108, 110, and 112. As another example, processor 120 may be configured to execute one or more additional modules that may perform some or all of the functionality attributed below to one of modules 106, 108, 110, and 112.

Figure 2:
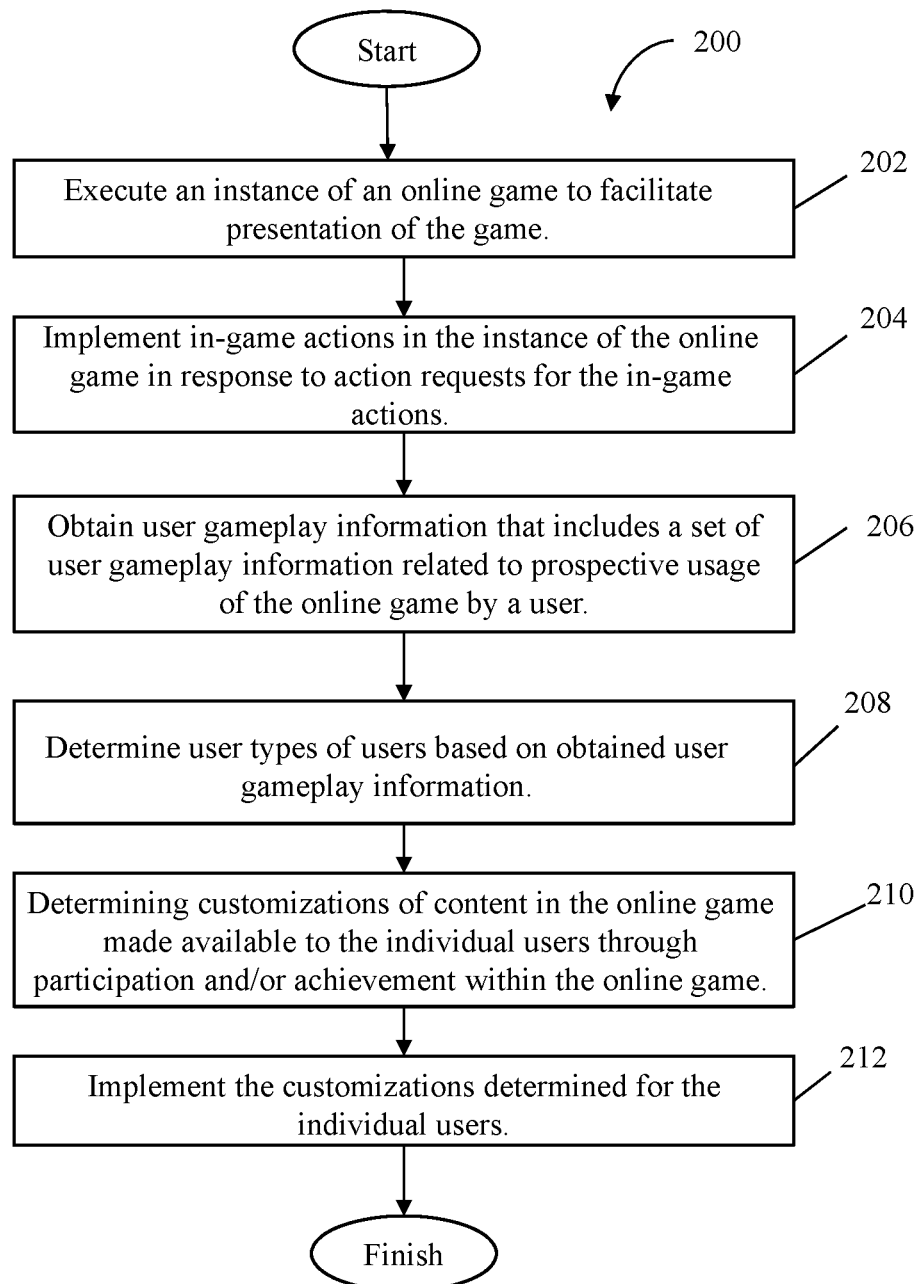
FIG. 2 illustrates a method for adjusting individualized content made available to users of an online game, in accordance with one or more implementations.

FIG. 2 illustrates a method 200 for adjusting content presented to a user of an online game based on user gameplay information. The operations of method 200 presented below are intended to be illustrative. In some embodiments, method 200 may be accomplished with one or more additional operations not described, and/or without one or more of the operations discussed. Additionally, the order in which the operations of method 200 are illustrated in FIG. 2 and described below is not intended to be limiting.

In some embodiments, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At an operation 202, an instance of an online game may be executed to facilitate presentation of the game to users. The game, for instance, may include parameters including a size and/or type of virtual space the game will be played on, the number of players, resource types, user-controlled elements, and/or buildings initially allocated to users. Operation 202 may be performed by a game module that is the same as or similar to game module 106, in accordance with one or more implementations.

At an operation 204, in-game actions may be implemented in the instance of the game in response to action requests for in-game actions by theusers. In implementations, the in-game actions may include collecting, harvesting, and/or manufacturing resources, player versus player competitions such as battles and skills competitions, and player versus environment interactions such as map exploration and quest completion. Operation 204 may be performed by a game module that is the same or similar to game module 106, in accordance with one or more implementations.

At an operation 206, gameplay information may be obtained that includes a set of user gameplay information related to prospective usage of the online game by a first user. In implementations, the set of user gameplay information may include online game usage information associated with the first user, online game usage information associated with other users associated with the first user, and/or the first user's usage of other online games. User gameplay information may include past behavior (online game usage) by users within the online game and/or other information known about the users, such as demographic information, geographic information, gameplay in other online games, gameplay of friends, etc. User gameplay information may comprise any information that may be used to predict a user's preferred style of gameplay going forward. Additionally, the set of user gameplay information may include at least one of specific in-game actions performed most frequently by the first user in the online game and in-game action types performed most frequently by the first user in the online game.

At operation 208, user types are determined based on obtained user gameplay information. A first user type may be determined for the first user based on the first set of user gameplay information. The user types may comprise at last one of a collection and harvesting type, a player versus player type, and a player versus environment type. User types may be determined based on the frequency with which a user has performed specific in-game actions or types of in-game actions. Operation 208 may be performed by a user type module that is the same as or similar to user type module 112, in accordance with one or more implementations.

At operation 210, user gameplay information is used to determine the customization of content in the online game made available to the individual users through participation and/or achievement within the online game. In implementations, the customizations are designed to enhance prospective usage of the online game by the users. The customizations may include customization of content made available to a first user to enhance prospective usage of the online game by the first user, the customization being determined based on the set of user gameplay information.

The customizations may affects content made available to users through the users' in-game actions, which may include of at least one of exploring a map, researching a technology or skill, purchasing an in-game item, and completing an in-game achievement. The customizations may affect content that includes at least one of in-game items, in-game powers, in-game skills, in-game technologies, in-game pets, in-game transportation units, in-game units, and in-game buildings available to users. In implementations, the customizations for the users may be determined based on the predicted user types, such that the determination of the customization for the first user is determined based on the first user type for the first user. Operation 210 may be performed by a customization module that is the same as or similar to customization module 110, in accordance with one or more implementations.

At operation 212, customizations determined for the individual users are implemented, such that the customization for the first user is implemented in the instance of the online game. Operation 212 may be performed by a game module that is the same as or similar to the game module 106, in accordance with one or more implementations.

Figure 3:
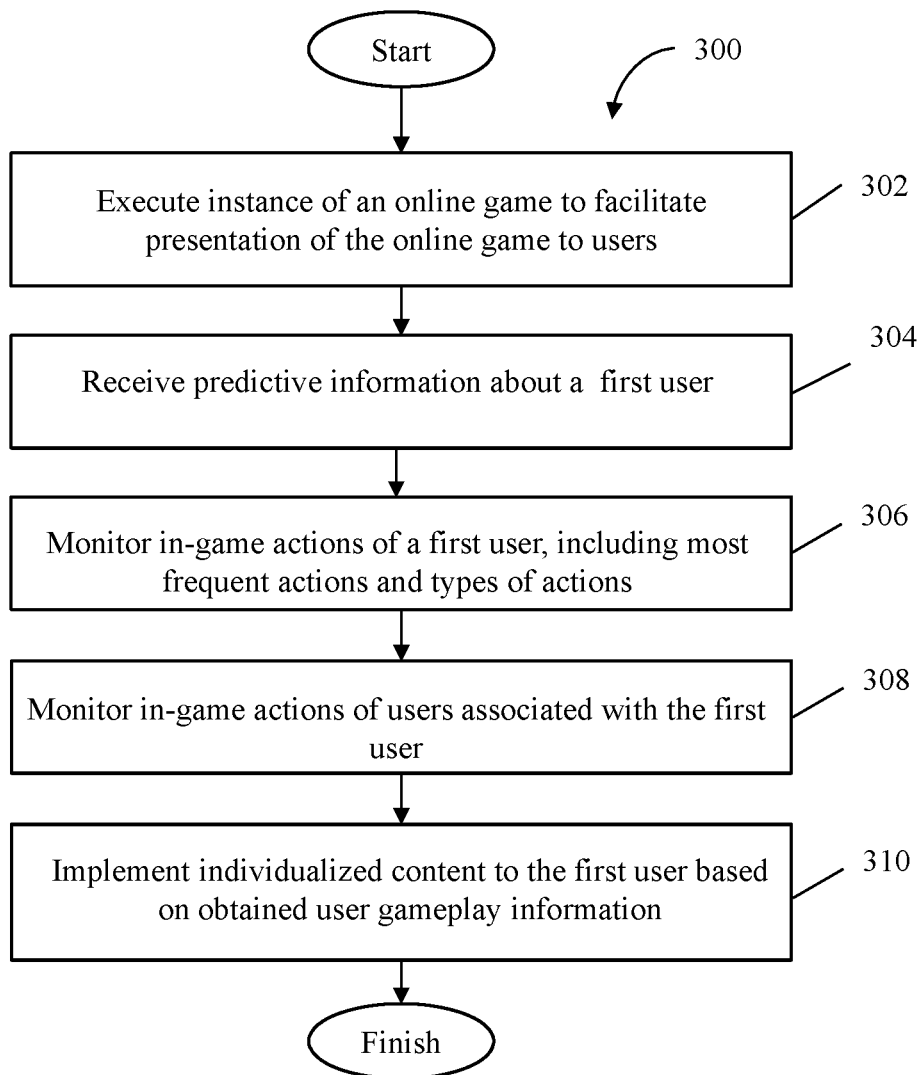
FIG. 3 illustrates a method for implementing individualized content made available to users of an online game by monitoring the gameplay content of a plurality of users, in accordance with one or more implementations.

FIG. 3 illustrates a method for implementing individualized content made available to a first user of an online game, in accordance with one or more implementations. The operations of method 300 presented below are intended to be illustrative. In some embodiments, method 300 may be accomplished with one or more additional operations not described, and/or without one or more of the operations discussed. Additionally, the order in which the operations of method 300 are illustrated in FIG. 3 and described below is not intended to be limiting.

In some embodiments, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

At operation 302, an instance of a online game may be executed to facilitate presentation of the game to users. The game, for instance, may include parameters including a size and/or type of virtual space the game will be played on, the number of players, resource types, user-controlled elements, and/or buildings initially allocated to users. Operation 302 may be performed by a game module that is the same as or similar to game module 106, in accordance with one or more implementations.

At operation 304, predictive information about a first user is obtained. Predictive information may include any information that is correlated with a certain type of gameplay or an increased frequency of certain in-game actions and/or types of in-game actions. Examples include demographic information, geographic information (obtained for example from the first user's IP address), previous gameplay of the first user in other online games, types of other games played by the user, games played by other users associated with the first user, etc. In some implementations, for example when the online game is accessed through a social networking website, the amount of information about the first user that may be obtained may be quite substantial, including hobbies and other activities of the first user, etc. Operation 304 may be performed by a user information module that is the same as or similar to user information module 108, in accordance with one or more implementations.

At operation 306, a user's in-game actions are monitored. In implementations, such monitoring includes tracking the frequency with which the first user engages in certain in-game actions or types of in-game actions. At operation 308, the user gameplay information of other users associated with the first user (e.g., connected via a social network, connected via an online game network, or connected based on having similar demographic, geographic, or other predictive information) are monitored to obtain user gameplay information. Operation 306 and 308 may be performed by a user information module that is the same as or similar to user information module 108, in accordance with one or more implementations.

At operation 310, individualized content is implemented to the first user based on the gameplay information obtained. For example, the first user may be provided more content to unlock with the in-game actions the first user performs or is anticipated to perform most frequently, or may be provided with additional content that is easily unlocked by trying out less preferred in-game actions, to encourage the first user to experience the full range of available gameplay. In some implementations, when a user first begins to play the on-line game, there is no individualized content, or the individualized content is based only on predictive information about the user, if available. As the user plays the on-line game, the customized content may be weighted more towards the user's actual usage of the game and less or not at all towards the predictive information about the user. Operation 310 may be performed by a customization module that is the same as or similar to customization module 110, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for customizing in-game content made available to users of an online game, the system comprising:

one or more processors configured by machine-readable instructions to:
execute an instance of the online game to facilitate presentation of the online game to the users via client computing platforms associated with the users, wherein the users include a first user and a second user, and wherein execution of the instance of the online game is performed such that the first user and the second user can interact with each other;
determine user types of the users based on usage of the online game by the users, wherein the user types include a first user type for the first user; and
obtain and/or determine customizations of in-game content within the same instance of the online game that are to be made available to individual ones of the users within the online game, wherein the customizations of the in-game content are based on the user types of the users, such that a first customization of in-game content includes particular in-game content not previously available to the first user but to be made available to the first user within the instance of the online game, wherein the first customization is based on the first user type;
wherein the execution of the instance of the online game is further performed such that, subsequent to implementation of the first customization, (i) the particular in-game content is made available to the first user, and (ii) the first user and the second user can interact with each other within the same instance of the online game.

2. The system of claim 1, wherein the first user type for the first user is determined based on a first set of user gameplay information.

3. The system of claim 1, wherein the first user type for the first user is based on information provided by the first user.

4. The system of claim 1, wherein the user types characterize prospective usage of the online game by the users.

5. The system of claim 1, wherein the user types comprise at least one of
   a) a collection and harvesting type preferring at least one of resource collection, resource cultivation and resource manufacturing,
   b) a player versus player type, preferring competing with other users within the online game, and
   c) a player versus environment type preferring completing quests.

6. The system of claim 1, wherein the one or more processors are further configured by machine-readable instructions to monitor the users' usage of the online game.

7. The system of claim 2, wherein the first set of user gameplay information comprises online game usage information pertaining to other users that are associated with the first user.

8. The system of claim 2, wherein the first set of user gameplay information comprises at least one of: (i) first user's usage of other online games, and (ii) other users' usage of the online game, wherein the other users are associated with the user.

9. The system of claim 1, wherein the first customization is made available to the first user through first user's in-game actions, wherein the first user's in-game actions comprise at least one of exploring a map, researching a technology or skill, purchasing an in-game item, and/or completing an in-game achievement.

10. The system of claim 2, wherein the first set of user gameplay information comprises at least one of:
   (i) specific in-game actions, and
   (ii) in-game action types performed most frequently by the first user within the instance of the online game.

11. A computer-implemented method for customizing in-game content made available to users of an online game, the method being implemented in a computer system that includes one or more processors configured by machine-readable instructions, the method comprising:
executing an instance of the online game to facilitate presentation of the online game to the users via client computing platforms associated with the users, wherein the users include a first user and a second user, and wherein executing the instance of the online game is performed such that the first user and the second user can interact with each other;
determining user types of the users based on usage of the online game by the users, wherein the user types include a first user type for the first user; and
obtaining and/or determining customizations of in-game content within the same instance of the online game that are to be made available to individual ones of the users within the online game, wherein the customizations of the in-game content are based on the user types of the users, such that a first customization of playable in-game content includes particular in-game content not previously available to the first user but to be made available to the first user within the instance of the online game, wherein the first customization is based on the first user type;
wherein executing the instance of the online game is further performed such that, subsequent to implementation of the first customization, (i) the particular in-game content is made available to the first user, and (ii) the first user and the second user can interact with each other within the same instance of the online game.

12. The method of claim 11, wherein the first user type for the first user is determined based on a first set of user gameplay information.

13. The method of claim 11, wherein the first user type for the first user is based on information provided by the first user.

14. The method of claim 11, wherein the user types characterize prospective usage of the online game by the users.

15. The method of claim 11, wherein the user types comprise at least one of
   a) a collection and harvesting type preferring at least one of resource collection, resource cultivation and resource manufacturing,
   b) a player versus player type, preferring competing with other users within the online game, and
   c) a player versus environment type preferring completing quests.

16. The method of claim 11, further comprising monitoring the users' usage of the online game.

17. The method of claim 12, wherein the first set of user gameplay information comprises online game usage information pertaining to other users that are associated with the first user.

18. The method of claim 12, wherein the first set of user gameplay information comprises at least one of: (i) first user's usage of other online games, and (ii) other users' usage of the online game, wherein the other users are associated with the user.

19. The method of claim 11, wherein the first customization is made available to the first user through first user's in-game actions, wherein the first user's in-game actions comprise at least one of exploring a map, researching a technology or skill, purchasing an in-game item, and/or completing an in-game achievement.

20. The method of claim 12, wherein the first set of user gameplay information comprises at least one of:
   (i) specific in-game actions, and
   (ii) in-game action types performed most frequently by the first user within the instance of the online game.

\* \* \* \* \*